(12) United States Patent
Henseleit et al.

(10) Patent No.: US 12,522,161 B2
(45) Date of Patent: Jan. 13, 2026

(54) SECONDARY COMMUNICATION BUS FOR A MODIFIED VEHICLE

(71) Applicant: The Braun Corporation, Winamac, IN (US)

(72) Inventors: Andrew Henseleit, Noblesville, IN (US); Joseph Miller Geddes, Zionsville, IN (US); John Hayes, Rochester, IN (US)

(73) Assignee: The Braun Corporation, Winamac, IN (US)

( * ) Notice: Subject to any disclaimer, the term of this patent is extended or adjusted under 35 U.S.C. 154(b) by 54 days.

(21) Appl. No.: 18/413,681

(22) Filed: Jan. 16, 2024

(65) Prior Publication Data
US 2024/0239277 A1 Jul. 18, 2024

Related U.S. Application Data

(60) Provisional application No. 63/480,133, filed on Jan. 17, 2023.

(51) Int. Cl.
*B60R 16/023* (2006.01)
*A61G 3/06* (2006.01)
(Continued)

(52) U.S. Cl.
CPC ........ *B60R 16/0231* (2013.01); *B60G 17/017* (2013.01); *E05F 15/659* (2015.01);
(Continued)

(58) Field of Classification Search
CPC . B60R 16/0231; B60G 17/017; E05F 15/659; H04L 12/40; H04L 2012/40215;
(Continued)

(56) References Cited

U.S. PATENT DOCUMENTS

2003/0117298 A1 6/2003 Tokunaga et al.
2017/0278320 A1 9/2017 Isozaki et al.
2020/0389469 A1* 12/2020 Litichever ............. H04L 63/145

FOREIGN PATENT DOCUMENTS

FR 3002401 A1 * 8/2014 ....... H04L 12/40156

OTHER PUBLICATIONS

International Search Report, Search Strategy, and Written Opinion of the International Searching Authority for PCT/US2024/011590, May 2, 2024, 11 pages, International Searching Authority for the European Patent Office.

* cited by examiner

*Primary Examiner* — Long T Tran
*Assistant Examiner* — Charles J Brauch
(74) *Attorney, Agent, or Firm* — Daniel Tallitsch; Tyler Schultz

(57) ABSTRACT

A vehicle may be modified to include a secondary data network forming a proprietary communication system used in the operation, maintenance, diagnostics, programming, and logistics of a mobility system. The secondary data network may be coupled to the vehicle's OEM CAN bus via a gateway module. The gateway module can receive and selectively recode data from the OEM CAN bus that is relevant to the mobility system and re-broadcast the recoded data on the secondary data. The gateway module may also receive and selectively recode data from the secondary data network that is relevant to the vehicle and re-broadcast the recoded data on the OEM CAN bus.

20 Claims, 1 Drawing Sheet

(51) Int. Cl.
 *B60G 17/017* (2006.01)
 *E05F 15/659* (2015.01)
 *H04L 12/40* (2006.01)

(52) U.S. Cl.
 CPC .............. *H04L 12/40* (2013.01); *A61G 3/061* (2013.01); *E05Y 2900/50* (2013.01); *H04L 2012/40215* (2013.01)

(58) Field of Classification Search
 CPC .. H04L 12/4625; A61G 3/061; E05Y 2900/50
 See application file for complete search history.

SECONDARY COMMUNICATION BUS FOR A MODIFIED VEHICLE

CROSS REFERENCE TO OTHER APPLICATIONS

This application claims priority to U.S. Provisional Patent Application No. 63/480,133, filed on 17 Jan. 2023 and entitled "SECONDARY COMMUNICATION BUS FOR A MODIFIED VEHICLE," the contents of which is incorporated herein by reference. This application also incorporates by reference PCT Patent Application No. PCT/US24/11590, filed on 16 Jan. 2024.

FIELD OF THE DISCLOSURE

The present application relates generally to a modified passenger vehicle which may be configured to provide access to the vehicle for a physically limited passenger, and more particularly to a secondary data network for the vehicle that facilitates transmission of information among accessibility components and modules, provides those components and modules with information from the primary/OEM data network, and facilitates easy system expansion.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by aftermarket companies dedicated to supplying vehicles to physically limited passengers. Such vehicles can be modified by removing certain parts or structures within a vehicle, replacing those parts, and/or adding new parts specifically designed to accommodate the physically limited passenger.

For example, in one configuration, a vehicle is retrofitted with a ramp to enable a physically limited individual using a wheelchair to enter and exit the vehicle without the assistance of another individual. Other known products for retrofitting a vehicle, such as a van or sport utility vehicle (SUV), include but are not limited to wheelchair lifts, vehicle kneeling systems, wheelchair securement systems, wheelchair occupant restraint systems, transfer seats and hoists, accessible steering aids, hand controls, foot controls, stowage hoists, extension controls, etc. In some instances, a floor of an original equipment manufacturer (OEM) vehicle is lowered or otherwise modified to accommodate an entry and exit of the physically limited individual through a side door or other entrance of the vehicle into a middle part of the vehicle where the seating arrangement has been removed to accommodate an individual using a wheelchair. Similarly, the side door may be replaced, modified, and/or motorized and the side door opening may be enlarged. Once inside the vehicle, an individual who uses the assisted entrance can be secured while seated in the wheelchair or can transfer from the wheelchair into the driver's seat to allow the individual to drive the vehicle. Various accessories may be required in the vehicle, depending on the passenger's level of mobility, to enable the passenger to drive the vehicle.

FIG. 1 schematically illustrates one such prior art vehicle 10 that has been modified to allow access by a wheelchair passenger. The vehicle 10 includes a body 12 operatively coupled to front wheels 14 and rear wheels 16. The vehicle 10 is modified to include a kneeling suspension 30 that is adapted for kneeling one or more of the front wheels 14 and rear wheels 16, whereby the vehicle body 12 may be lowered to provide easier access for a wheelchair passenger. A first passenger side door 18 is located between the front wheels 14 and rear wheels 16 and provides access to a passenger for sitting in a front seat of the vehicle adjacent to the driver. A second passenger side door 20 is located rearward of the first passenger side door 18 and is modified to include a motor that is operative to open and/or close the door 20. The vehicle is also modified to include a ramp assembly 24 which provides rolling access of the wheelchair from ground level into an interior 28 of the vehicle 10. The ramp assembly 24 is installed at the opening 22 and is movable between a stored position under the vehicle floor (or in the interior 28 of the vehicle 10 in other embodiments) and a deployed position exterior to the vehicle 10 for rolling wheelchair access. Other access devices may be used as an alternative to the ramp assembly 24, such as a wheelchair lift.

In such known modified vehicles 10, the middle row of seats is removed from the manufacturer supplied vehicle to enable access to a wheelchair supporting a passenger or a driver. Once the wheelchair passenger or driver moves into the interior 28 of the vehicle, the passenger or driver may locate and secure the wheelchair and wheelchair passenger in the middle portion of the interior 28 behind the driver seat and passenger seat (not shown) of the front row. In some embodiments, the driver's seat may be modified to rotate about a pivotable base 32. The pivotable base 32 rotates to pivot the driver's seat clockwise toward the middle portion of the interior 28 to enable the wheelchair passenger to transfer from the wheelchair to the driver's seat. In yet other instances, either one of the driver's seat and front passenger's seat may be removed and the wheelchair and wheelchair passenger may be located and secured in the driver's or front passenger's locations. In one embodiment, the wheelchair may be secured in the front passenger location using a docking station 34.

The vehicle 10 as provided by the OEM (Original Equipment Manufacturer) includes a data/communication network, usually a CAN (Controller Area Network) bus 36, that enables communication between and among the various OEM components of the vehicle, each of which may comprise a CAN bus node or ECU (Electronic Control Unit) 38. Modern vehicles usually have over fifty ECUs for controlling the engine, airbags, audio systems, and the numerous other OEM components and systems of the vehicle. The CAN bus 36 enables each ECU to communicate information with other ECUs without complex designated wiring. Instead, the CAN bus 36 conventionally comprises a simple wiring harness of two wires, a CAN high wire and a CAN low wire, that may be connected in some manner (e.g., daisy chained), to each ECU 38. In some cases, the CAN bus 36 can comprise a single wire. Each ECU 38 can broadcast data to the other ECUs via that simple wiring harness. The broadcasted data may then be accepted by each ECU 38, which can then check the data and decide whether to receive or ignore the data.

In the prior art vehicle 10, the installed powered accessibility components (e.g., the ramp assembly 24, the kneeling suspension 30, the pivoting seat base 32, the docking station 24) typically include a common control system 40 comprising controller 42 and gateway module 44. In other embodiments, each accessibility component may have its own controller and gateway module. As shown, the common controller 42 is uniquely configured to communicate with and control the specific powered accessibility components installed in that specific vehicle, for example, the specific door motor for opening and closing the second passenger door 20, the specific ramp assembly 24 for deploying and stowing the ramp platform, the specific kneeling suspension 30 for kneeling and raising the vehicle, the specific pivoting seat base 32 for rotating the pivoting the driver's seat, and the specific docking system for securing and/or releasing the wheeled mobility device. If it is desired to add or change the vehicle configuration, e.g., to add, replace, or remove powered accessibility components, the controller 42 needs to be reprogrammed and revalidated with the vehicle platform. The common gateway module 44 is configured to receive data broadcast on the OEM CAN bus 36, decode/translate that data, and communicate the translated data to the common controller 42. The controller 42 can use the translated data to provide safety interlocks, for example, preventing operation of the powered accessibility components when the vehicle transmission is set to drive. The gateway module 44 may also be configured to receive data from the controller 42 (such as the status of the powered accessibility components), encode that data, and communicate the encoded data to the OEM CAN bus 36.

Today, CAN bus is the standard data network in practically all automotives. Raw CAN bus data, however, is coded and not human readable. To extract information from a given CAN signal, a specific set of decoding information is required, i.e., a translation file, such as a DBC (Database CAN) file which among other things will include communication protocols and message ID's. Unfortunately, CAN decoding information/rules are usually proprietary, known only to the OEM and not widely shared with aftermarket component suppliers. Although some limited exceptions exist—for example, OBD (On Board Diagnostic) information such as speed, rpm, and throttle position—CAN decoding information and rules differ across different models and brands, and it is not unusual for those rules to change at mid-year model refreshes.

The proprietary, differing, and changing nature of the OEMs' decoding information presents one of the greatest challenges for vehicle modifiers and upfitters, especially those who engineer across multiple vehicle platforms. To enable their components to receive information from or to transmit information to the vehicle CAN bus, modifiers and upfitters must create component hardware and software (e.g., control system 40, including both the controller 42 and gateway module) that are specific to each vehicle platform and the specific accessibility components installed in that vehicle platform and must redesign/revalidate the control system 40 each time the OEM changes their decoding protocols. A large amount of design time is lost to customizing components for each vehicle platform and revalidating those components based on frequent changes within a single vehicle platform.

SUMMARY OF THE EMBODIMENTS

The problems of the prior art may be solved through use of a secondary data/communication network (e.g., a secondary CAN bus) comprising a gateway module that is configured to translate data from the OEM CAN bus for use by mobility components connected to the secondary data network. In one embodiment, the gateway module could: (1) receive a CAN signal encoded using the OEM protocol from the OEM CAN bus; (2) decode the CAN signal; (3) recode the decoded CAN signal using the protocol of the secondary data network; and (4) share the recoded CAN signal with the mobility equipment through the secondary data network. A secondary data/communication network configured as such could be moved from one OEM's vehicle to another OEM's vehicle with the only validation required being the single gateway module that is attached to the OEM CAN bus. The mobility equipment connected to the secondary data network would not require validation or customization for each vehicle platform. Use of the gateway module would also allow expandability, whereby the modifier may produce new feature sets after launch without having to revalidate with the vehicle platform. A secondary communication network also presents the possibility of allowing approved accessory providers to easily participate in the modifier's system instead of having to independently overcome the above-referenced challenges of connecting directly to the proprietary OEM CAN bus system.

The secondary communication bus may be limited to mobility/accessibility equipment. In that regard, the system could include a continuous flow of data that is limited to the modules and systems relevant to operating mobility equipment. A single module (point of contact) with the OEM system may be provided to relay the relevant OEM signals (PRNDL, Door status, etc.), which in many cases are only a few signals, to the mobility data bus for access by mobility equipment. By receiving and translating relevant OEM signals, the secondary communication bus will streamline development for approved accessory suppliers. Moreover, having only a single point of contact with the OEM system makes development from one chassis to another easy by only requiring the software for that single gateway module to change, instead of having to re-validate the entire system in every different OEM vehicle.

In a first embodiment of the present disclosure, there is provided a data communication network comprising a gateway module and a plurality of modules. The gateway module may be configured to receive a signal encoded using a first protocol, recode the signal into a recoded signal using a second protocol, and transmit the recoded signal for use by the plurality of modules. The second protocol can be different from the first protocol.

In one version of that embodiment, the data communication network comprises a bus, wherein the bus transmits the recoded signal to the plurality of modules. The bus can be a CAN bus.

In another version, the plurality of modules comprise a plurality of ECUs.

In yet another version, each of the plurality of modules correspond to at least one of the plurality of accessibility components.

In yet another version, the plurality of modules comprises a ramp module.

In yet another version, the plurality of modules comprises a door module.

In yet another version, the plurality of modules comprises a kneel module.

Any of these versions of the first embodiment can be incorporated in a vehicle having an OEM data communication network coupled to the gateway module, wherein the OEM data communication network provides the signal to the gateway module.

In a second embodiment of the present disclosure, there is provided a vehicle having a first data communication network configured to enable communication of a first plurality of signals encoded using a first protocol among a first plurality of modules. The vehicle can include a second data communication network configured to enable communication of a second plurality of signals encoded using a second protocol among a second plurality of modules, wherein the second protocol is different from the first protocol. The vehicle can also include a gateway module for the second data communication network that is configured to receive the first plurality of signals, recode at least one of the first plurality of signals into a recoded signal using the second protocol, and communicate the recoded signal through the second data communication network to the second plurality of modules.

In another version of that embodiment, the first data communication network can comprise a first bus. The first bus can be a first CAN bus.

In yet another version, the second data communication network can comprise a second bus, wherein the second bus transmits the recoded signal to the second plurality of modules. The second bus can be a second CAN bus.

In yet another version, the first plurality of modules can be a first plurality of ECUs.

In yet another version, the second plurality of modules can be a second plurality of ECUs.

In yet another version, the vehicle can include a plurality of accessibility components, wherein each of the second plurality of modules correspond to at least one of the plurality of accessibility components.

In yet another version, the second plurality of modules comprises a ramp module.

In yet another version, the second plurality of modules comprises a door module.

In yet another version, the second plurality of modules comprises a kneel module.

In a third embodiment of the present disclosure, a method is provided for modifying a vehicle having a first data communication network configured to enable communication of a first plurality of signals encoded using a first protocol among a first plurality of modules. The method can comprise the steps of: (1) providing the vehicle with a second data communication network configured to enable communication of a second plurality of signals encoded using a second protocol among a second plurality of modules, wherein the second protocol is different from the first protocol; and, (2) coupling a gateway module of the second data communication network to the first data communication network, wherein the gateway module is configured to: receive the first plurality of signals; recode at least one of the first plurality of signals into a recoded signal using the second protocol; and communicate the recoded signal through the second data communication network to the second plurality of modules.

In another version of that embodiment, the first data communication network comprises a first bus. The first bus can be a CAN bus.

In yet another version, the second data communication network comprises a second bus, wherein the second bus transmits the recoded signal to the second plurality of modules. The second bus can be a CAN bus.

In yet another version, the method can also include the step of providing the vehicle with a plurality of accessibility components, wherein each of the second plurality of modules correspond to at least one of the plurality of accessibility components.

In yet another version, the method can also include the step of providing the vehicle with a plurality of accessibility components includes installing a ramp, whereby one of the second plurality of modules comprises a ramp module.

In yet another version, the method can also include the step of providing the vehicle with a plurality of accessibility components includes modifying a door, whereby the second plurality of modules comprises a door module.

In yet another version, the step of providing the vehicle with a plurality of accessibility components includes installing a kneeling system, whereby the second plurality of modules comprises a kneel module.

In a fourth embodiment of the present disclosure, a method is provided for modifying a first vehicle and a second vehicle, the first vehicle having a first vehicle OEM data communication network configured to enable communication of first plurality of signals encoded using a first vehicle OEM protocol among a plurality of first vehicle OEM modules and the second vehicle having a second vehicle data communication network configured to enable communicate a second plurality of signals encoded using a second vehicle OEM protocol among a plurality of second vehicle OEM modules, the first vehicle OEM protocol being different from the second vehicle OEM protocol. The method can comprising the steps of: (1) coupling a first gateway module to the first vehicle OEM data communication network, wherein the first gateway module is configured to receive the first plurality of signals, recode at least one of the first plurality of signals into a first recoded signal, and transmit the first recoded signal; (2) coupling a second gateway module to the second vehicle OEM data communication network, wherein the second gateway module is configured to receive the second plurality of signals, recode at least one of the second plurality of signals into a second recoded signal, and transmit the second recoded signal; and (3) providing a plurality of aftermarket modules, wherein the plurality of aftermarket modules are compatible with both the first recoded signal and the second recoded signal.

In another version of that embodiment, each of the first vehicle OEM data communication network and the second vehicle OEM data communication network comprise a bus. The bus can be a CAN bus.

In yet another version, the method also comprises the steps of coupling the first gateway module to at least one of the plurality of aftermarket modules via a first data communication network and coupling the second gateway module to at least one of the plurality of aftermarket modules via a second data communication network.

In yet another version, at least one of the first data communication network and the second data communication network comprises a bus, wherein the bus is configured to transmit at least one of the first recoded signal and the second recoded signal to the plurality of aftermarket modules. The bus can be a CAN bus.

In yet another version, the method also includes the step of providing at least one of the first vehicle and the second vehicle with a plurality of accessibility components, wherein each of the plurality of aftermarket modules correspond to at least one of the plurality of accessibility components.

In yet another version, the step of providing at least one of the first vehicle and the second vehicle with a plurality of accessibility components includes installing a ramp, whereby one of the plurality of aftermarket modules comprises a ramp module.

In yet another version, the step of providing at least one of the first vehicle and the second vehicle with a plurality of accessibility components includes modifying a door, whereby one of the plurality of aftermarket modules comprises a door module.

In yet another version, the step of providing at least one of the first vehicle and the second vehicle with a plurality of accessibility components includes installing a kneeling system, whereby one of the plurality of aftermarket modules comprises a kneel module.

In other embodiments of the present disclosure, any combination of the above features can be used.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

DETAILED DESCRIPTION OF THE EMBODIMENTS

Figure 1:
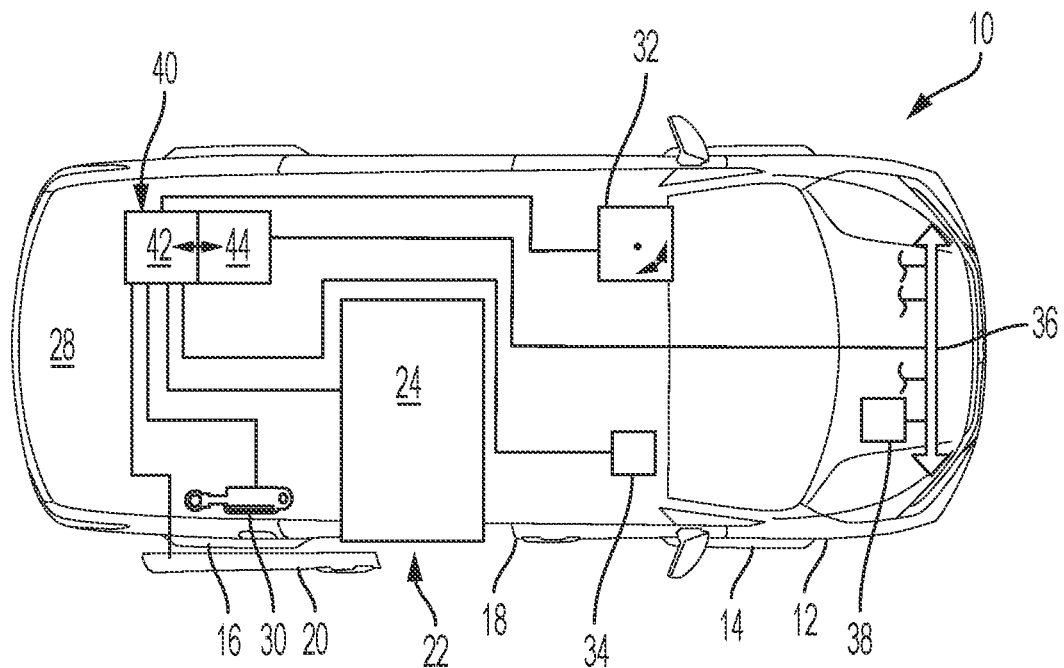
FIG. 1 schematically illustrates a prior art modified vehicle with a prior art control system for accessibility components; and, FIG. 2 schematically illustrates a first embodiment of an improved modified vehicle that includes a secondary data network that interfaces with the OEM data network.
Figure 2:
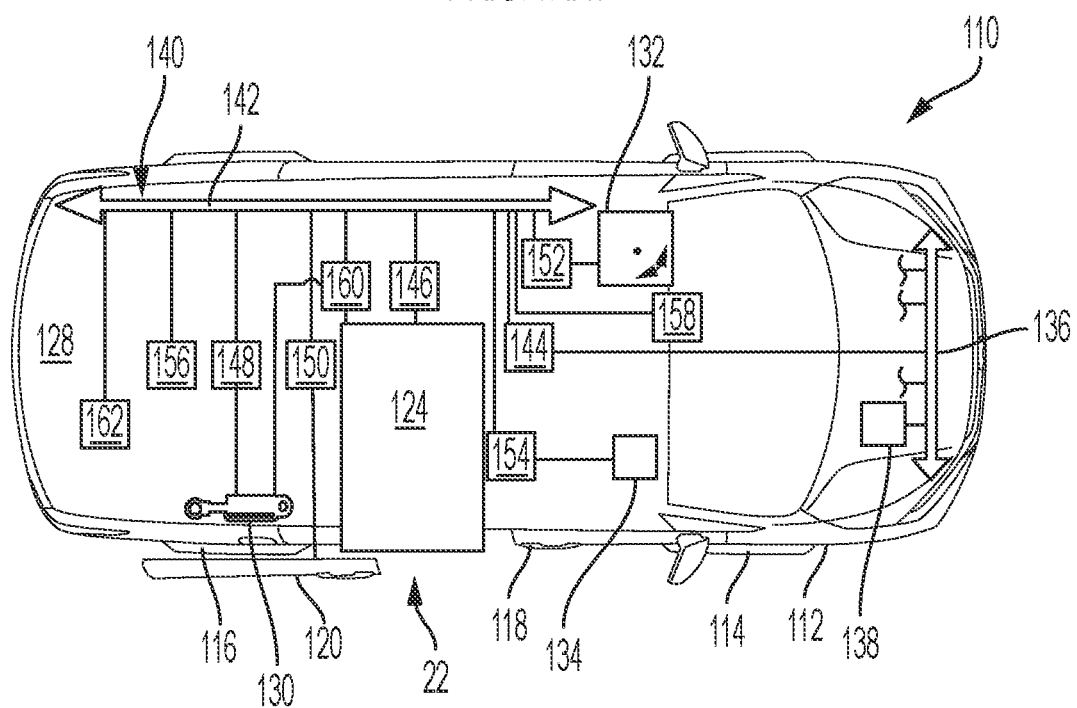

FIG. 2 schematically illustrates a first embodiment of an improved modified vehicle 110 that has been modified to allow access by a wheelchair passenger. The vehicle 110 may include a body 112 operatively coupled to front wheels 114 and rear wheels 116. The vehicle 110 may be modified to include a kneeling suspension 130 that is adapted for kneeling one or more of the front wheels 114 and rear wheels 116, whereby the vehicle body 112 may be lowered to provide easier access for a wheelchair passenger. A first passenger side door 118 may located between the front wheels 114 and rear wheels 116 and may provide access to a passenger for sitting in a front seat of the vehicle adjacent to the driver. A second passenger side door 120 may be located rearward of the first passenger side door 118 and may be modified to include a motor that is operative to open and/or close the door 120. The vehicle may also be modified to include a ramp assembly 124 which provides rolling access of the wheelchair from ground level into an interior 128 of the vehicle 110. The ramp assembly 124 may be installed at the opening 22 and may be movable between a stored position (which may be, for example, under the vehicle floor or in the interior 128 of the vehicle 110) and a deployed position exterior to the vehicle 110 for rolling wheelchair access. Other access devices may be used as an alternative to the ramp assembly 124, such as a wheelchair lift.

The middle row of seats may removed from the manufacturer supplied vehicle to enable access to a wheelchair supporting a passenger or a driver. Once the wheelchair passenger or driver moves into the interior 128 of the vehicle, the passenger or driver may locate and secure the wheelchair and wheelchair passenger in the middle portion of the interior 128 behind the driver seat and passenger seat (not shown) of the front row. The driver's seat may be modified to rotate about a pivotable base 132. The pivotable base 132 rotates to pivot the driver's seat clockwise toward the middle portion of the interior 128 to enable the wheelchair passenger to transfer from the wheelchair to the driver's seat. In yet other instances, either one of the driver's seat and front passenger's seat may be removed and the wheelchair and wheelchair passenger may be located and secured in the driver's or front passenger's locations. For example, the wheelchair may be secured in the front passenger location using a docking station 134.

The vehicle 110 as provided by the OEM (Original Equipment Manufacturer) may include a data/communication network, usually a CAN bus 136, that enables communication between and among the various OEM components of the vehicle, each of which may comprise a CAN bus node or ECU (Electronic Control Unit) 138. The CAN bus 136 enables each ECU to communicate information with other ECUs without complex designated wiring. Instead, the CAN bus 136 may comprises a simple wiring harness of one to two wires, that may be connected in some manner (e.g., daisy chained) to each ECU 138. Each ECU 138 can broadcast data to the other ECUs via that simple wiring harness. The broadcasted data may then be accepted by each ECU 138, which can then check the data and decide whether to receive or ignore the data.

According to the present inventions, the vehicle 110 may be modified to include a secondary data network 140. The secondary data network 140 may form a proprietary communication system that is used in the operation, maintenance, diagnostics, programming, and logistics of a mobility system. In one embodiment, the secondary data network 140 links the accessibility components (in this example, the motorized door 120, the ramp assembly 124, the pivoting seat base 132, the kneeling suspension 130, and the docking station 134) together for feedback, control, and operation. The secondary data network 140, viewed as a whole, may include programming firmware, diagnostics, and storing of trouble codes for the accessibility components (also referred to herein as mobility systems). The secondary data network 140 may also include an access point for approved accessories from outside vendors to have access to access the data broadcast on the network 140. Data broadcast on the secondary data network 140 may include key data points relevant to the accessibility components, such as PRNDL status, operation status (on/off), parking brake, ramp/lift (e.g., sliding) door status, ramp status, etc.

In one embodiment, the secondary data network 140 comprises a secondary CAN bus 142. The secondary CAN bus 142 may comprise a simple wiring harness of two wires, a CAN high wire and a CAN low wire, that may be connected (e.g., daisy chained) to a plurality of modules in the mobility application. The plurality of modules may be configured to receive/accept data broadcast on the secondary CAN bus 142, which can then check the data and decide whether to receive or ignore the data. At least some of the plurality of modules may additionally be configured to provide their own data into the secondary CAN bus for receipt and use by other modules. The mobility application can be expanded to include new modules simply by connecting the new module to the secondary CAN bus 142.

Each accessibility component may be associated with a module connected to the secondary CAN bus. Each module may comprise an ECU for controlling the operation of the associated accessibility component. The ECU may contain a processor, CAN, and a series of connectors to bring signals in and out of the ECU. The ECU can be programmed in various ways. In one embodiment, the ECU may use the CAN system itself as the programming medium. Common programming practices include the use of USB, Serial Communication Ports, and JTAG programmers. In some cases, a group of accessibility components may be associated with a single module.

In the depicted embodiment, the mobility system includes a ramp module 146 associated with the ramp assembly 124, a kneel module 148 associated with the kneeling suspension 130, a door module 150 associated with the power operating lift or ramp (e.g., sliding) door 120, a seat module 152 associated with the pivoting seat base 132, a dock module 154 associated with the docking station 134, a diagnostics module 156, a switch module 158, an override module 160, and a connectivity module 162. The data provided by these modules, which may include ramp status, kneel status, door position, docking station status, pivoting seat status, etc., will be used by the other modules in this system to operate and run the mobility system as a whole.

The ramp module 146 may be designed to run the ramp assembly/system 124 in the vehicle 110. It can use inputs from the ramp system 124 (switches, motor current, encoder, etc.) to drive the ramp motor and thereby the ramp platform in and out depending on vehicle state. The ramp module may have some level of built-in obstacle detection as well to keep the system from self harm.

The kneel module 148 may be designed to run the kneeling suspension/system 130 in the vehicle 110. It can use inputs from the kneeling system 130 (such as switches, electrical current, etc.) to determine and drive a kneeling actuator during conversion operation.

The diagnostics module 156 may comprise a memory for storing data broadcast on the secondary data network 140 for later diagnostic use, for example, by a technician to diagnose problems with the mobility system. In one embodiment, the diagnostics module 156 will store all broadcast data in memory, overwriting old data only after the memory is full. In other embodiments, the diagnostics module only stores data associated with a fault, which may include some or all data broadcast before and/or after the fault is received.

The switch module 158 may be used to input signals from all of the operational/data input switches that are not used in the other modules specific to their application. It also may control external lighting, OEM door operation (inhibit and actuation), etc.

The override module 160 can be designed to be used in the event the vehicle ramp system 124 and kneel system 130 are not working via their intended modules 146, 148. The override module 160 may have inputs to run the ramp assembly 124 in and out, as well as the kneel system 130 to the "up" position to be able to drive the vehicle 110. The override module may bypass modules 146, 148 and take the motors straight to vehicle battery power.

The connectivity module 162 would be used to gather specific data from the secondary CAN bus 142 and transmit that data to a remote database for evaluation. From that point there may be actionable items for dealers or internal use. The connectivity module 162 could have multiple transmission mediums including: Bluetooth, Wifi, Cellular, etc. This data could be used to help maintain vehicles or assist dealers with troubleshooting remotely.

The secondary data network 140 may also be coupled to (e.g., daisychained) to the OEM data network 136 through a gateway module 144 for receiving broadcast data from the OEM data network 136. In one embodiment, the gateway module 144 may be configured to receive data broadcast on the OEM CAN bus 136, decode that data (in some cases, using OEM protocol), reencode the decoded data (in some cases using the modifier's proprietary protocol), and broadcast the decoded data on the secondary CAN bus 142. In other embodiments, the gateway module 144 checks the broadcast data from the OEM CAN bus 136 and decides whether to recode and/or re-broadcast on the secondary CAN bus 142. In some embodiments, the gateway module 144 only re-broadcasts data from the OEM CAN bus 136 that is relevant to the mobility application, and disregards data that is irrelevant. For example, data re-broadcast on the secondary data network 140 may include PRNDL status, operation status (on/off/sleep/low power), parking brake, door operation via pillar button, door operation via overhead or secondary console, door operation via keyfob, keyfob unlock/lock/liftgate button presses, liftgate operation via switch, door status open/close/ajar/etc., door enabled/disabled, vehicle running, headlights on daytime/night, remote start active, etc.

The gateway module 144 may also be configured to receive broadcast data from the secondary CAN bus 142, such as the status of the powered accessibility components (ramp deployed/stowed, wheelchair secured/released, ramp or wheelchair lift (e.g., sliding) door open/closed, seat pivoted/forward facing, suspension kneeled/normal, etc.), recode that data using the OEM's data protocols, and broadcast the encoded data to the OEM CAN bus 136. In some embodiments, the gateway module 144 checks the broadcast data from the secondary CAN bus 142 and decides whether to recode and/or re-broadcast on the OEM data network 136.

Notably, the use of a secondary data network 140 makes it easier for an accessory provider to use the same accessibility components in multiple vehicles including from multiple OEMs, since the data protocol being used by the secondary bus will not change. Moreover, Vehicle related signals necessary for use by the mobility system can be received from the Gateway module 144, rather than each accessory individually obtaining the signals directly from the OEM CAN bus 136, which also leaves one less connection to the OEM system thereby lowering the chances of creating vehicle errors. Indeed, with every wired CAN node that is added to the OEM CAN bus 136 there are more chances that the OEM CAN system could crash/fault. Wires could be pinched, swapped, or internally shorted in the connector. Minimizing the conversion impact on the OEM system is priority.

Although the secondary data network 140 has been described as including a CAN bus 142, the bus 142 can be encrypted and operate via multiple communication avenues, including CAN, LIN, ETHERNET, WIFI, etc. In that regard, the present inventions should not be limited specifically to CAN.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A vehicle comprising
a first data communication network configured to enable communication of a signal encoded using a first protocol among a first plurality of modules;
a second data communication network comprising a gateway module and a second plurality of modules, wherein the gateway module is configured to:
receive the signal encoded using the first protocol;
recode the signal into a recoded signal using a second protocol, the second protocol being different from the first protocol;
transmit the recoded signal for use by the second plurality of modules.

2. The vehicle of claim 1, wherein the second data communication network comprises a bus, wherein the bus transmits the recoded signal to the second plurality of modules.

3. The vehicle of claim 2, wherein the bus is a CAN bus.

4. The vehicle of claim 1, wherein the second plurality of modules comprise a plurality of ECUs.

5. The vehicle of claim 1, wherein each of the second plurality of modules corresponds to an accessibility component.

6. The vehicle of claim 1, wherein the second plurality of modules comprises a ramp module.

7. The vehicle of claim 1, wherein the second plurality of modules comprises a door module.

8. The vehicle of claim 1, wherein the second plurality of modules comprises a kneel module.

9. The vehicle of claim 1, wherein the first data communication network is an OEM data communication network.

10. A method for modifying a vehicle having a first data communication network configured to enable communication of a first plurality of signals encoded using a first protocol among a first plurality of modules, the method comprising the steps of:
providing the vehicle with a second data communication network configured to enable communication of a second plurality of signals encoded using a second protocol among a second plurality of modules, wherein the second protocol is different from the first protocol; and,
coupling a gateway module of the second data communication network to the first data communication network, wherein the gateway module is configured to: receive the first plurality of signals; recode at least one of the first plurality of signals into a recoded signal using the second protocol; and communicate the recoded signal through the second data communication network to the second plurality of modules.

11. The method of claim 10, wherein the first data communication network comprises a first bus.

12. The method of claim 11, wherein the first bus is a first CAN bus.

13. The method of claim 10, wherein the second data communication network comprises a second bus, wherein the second bus transmits the recoded signal to the second plurality of modules.

14. The method of claim 13, wherein the second bus is a second CAN bus.

15. The method of claim 10 further comprising the step of providing the vehicle with a plurality of accessibility components, wherein each of the second plurality of modules correspond to at least one of the plurality of accessibility components.

16. The method of claim 10, wherein the step of providing the vehicle with a plurality of accessibility components includes installing a ramp, whereby one of the second plurality of modules comprises a ramp module.

17. The method of claim 10, wherein the step of providing the vehicle with a plurality of accessibility components includes modifying a door, whereby the second plurality of modules comprises a door module.

18. The method of claim 10, the step of providing the vehicle with a plurality of accessibility components includes installing a kneeling system, whereby the second plurality of modules comprises a kneel module.

19. A method for modifying a first vehicle and a second vehicle, the method comprising the steps of:
providing the first vehicle, the first vehicle having a first vehicle OEM data communication network configured to enable communication of first plurality of signals encoded using a first vehicle OEM protocol among a plurality of first vehicle OEM modules;
providing the second vehicle, the second vehicle having a second vehicle OEM data communication network configured to enable communication of a second plurality of signals encoded using a second vehicle OEM protocol among a plurality of second vehicle OEM modules, the first vehicle OEM protocol being different from the second vehicle OEM protocol;
providing the first vehicle with a first gateway module and a first vehicle aftermarket data communication network, the first gateway module coupling the first vehicle aftermarket data communication network to the first vehicle OEM data communication network, wherein the first gateway module is configured to receive the first plurality of signals, recode at least one of the first plurality of signals into a first recoded signal, and transmit the first recoded signal;
providing the second vehicle with a second gateway module and a second vehicle aftermarket data communication network, the second gateway module coupling the second vehicle aftermarket data communication network to the second vehicle OEM data communication network, wherein the second gateway module is configured to receive the second plurality of signals, recode at least one of the second plurality of signals into a second recoded signal, and transmit the second recoded signal;
providing a plurality of aftermarket modules, wherein the plurality of aftermarket modules are compatible with both the first recoded signal and the second recoded signal.

20. The method of claim 19 further comprising the steps of providing at least one of the first vehicle and the second vehicle with a plurality of accessibility components, wherein each of the plurality of aftermarket modules correspond to at least one of the plurality of accessibility components.

* * * * *